(12) United States Patent
Lee et al.

(10) Patent No.: US 9,470,404 B2
(45) Date of Patent: Oct. 18, 2016

(54) FOLDABLE DISPLAY APPARATUS

(71) Applicant: Samsung Display Co., Ltd., Yongin (KR)

(72) Inventors: Sang-Wol Lee, Yongin (KR); Sang-Wook Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 102 days.

(21) Appl. No.: 14/474,497

(22) Filed: Sep. 2, 2014

(65) Prior Publication Data

US 2015/0330614 A1 Nov. 19, 2015

(30) Foreign Application Priority Data

May 13, 2014 (KR) .......................... 10-2014-0057452

(51) Int. Cl.
*F21V 21/30* (2006.01)
*B65D 85/38* (2006.01)
*G09F 9/30* (2006.01)
*F21Y 101/02* (2006.01)

(52) U.S. Cl.
CPC .............. *F21V 21/30* (2013.01); *B65D 85/38* (2013.01); *G09F 9/301* (2013.01); *F21Y 2101/02* (2013.01)

(58) Field of Classification Search
CPC .... F21V 21/30; F21Y 2101/02; B65D 85/38
USPC ........................................ 362/97.1
See application file for complete search history.

(56) References Cited

U.S. PATENT DOCUMENTS

| 6,377,324 B1* | 4/2002 | Katsura ............. G02F 1/133305 349/58 |
| 2002/0104769 A1* | 8/2002 | Kim ..................... G06F 1/1601 206/320 |
| 2003/0189759 A1 | 10/2003 | Kim et al. |
| 2004/0036818 A1 | 2/2004 | Kim et al. |
| 2012/0044620 A1* | 2/2012 | Song .................... G06F 1/1616 361/679.01 |
| 2013/0021762 A1* | 1/2013 | van Dijk .............. G06F 1/1652 361/749 |
| 2013/0342090 A1* | 12/2013 | Ahn ......................... G09F 9/33 312/258 |
| 2014/0029171 A1* | 1/2014 | Lee ......................... H05K 7/16 361/679.01 |
| 2014/0029212 A1* | 1/2014 | Hwang ................. H05K 1/028 361/749 |

FOREIGN PATENT DOCUMENTS

| KR | 10-2002-0012881 | 2/2002 |
| KR | 1020020012880 | 2/2002 |
| KR | 20020039891 | 5/2002 |
| KR | 10-2002-0050062 | 6/2002 |
| KR | 2002-0061045 | 7/2002 |
| KR | 100867608 | 11/2008 |
| KR | 10-2011-0100936 | 9/2011 |
| KR | 10-2014-0001376 | 1/2014 |
| KR | 10-2014-0015881 | 2/2014 |
| WO | 99/34348 | 7/1999 |

* cited by examiner

*Primary Examiner* — Laura Tso
(74) *Attorney, Agent, or Firm* — H.C. Park & Associates, PLC

(57) ABSTRACT

A foldable display apparatus including: a flexible display panel; a case including a first case body and a second case body that are coupled to each by a hinge; a first support plate coupled to the first case body to support a first side of the flexible display panel; and a second support plate coupled to the second case body to support a second side of the flexible display panel.

12 Claims, 6 Drawing Sheets

FOLDABLE DISPLAY APPARATUS

RELATED APPLICATION

This application claims priority from and the benefit of Korean Patent Application No. 10-2014-0057452, filed on May 13, 2014, which is hereby incorporated by reference for all purposes as if fully set forth herein.

BACKGROUND

1. Field

Exemplary embodiments relate to a foldable display apparatus having a foldable main body.

2. Discussion of the Background

For example, a flat panel display apparatus such as an organic light-emitting display apparatus needs to be modified flexibly, and to do this, the flat panel display apparatus may have a foldable structure for improving its portability.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a foldable display apparatus.

Additional aspects will be set forth in the detailed description which follows, and, in part, will be apparent from the disclosure, or may be learned by practice of the inventive concept.

According to one or more embodiments of the present invention, a foldable display apparatus includes: a flexible display panel that may be folded; a case comprising a first case body and a second case body that are coupled to each other by a hinge; a first support plate coupled to the first case body to support a first side of the flexible display panel in connection with a folding operation and an unfolding operation of the case; and a second support plate coupled to the second case body to support a second side of the flexible display panel in connection with the folding operation and the unfolding operation of the case.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the inventive concept.

DETAILED DESCRIPTION OF THE ILLUSTRATED EMBODIMENTS

Figure 1:
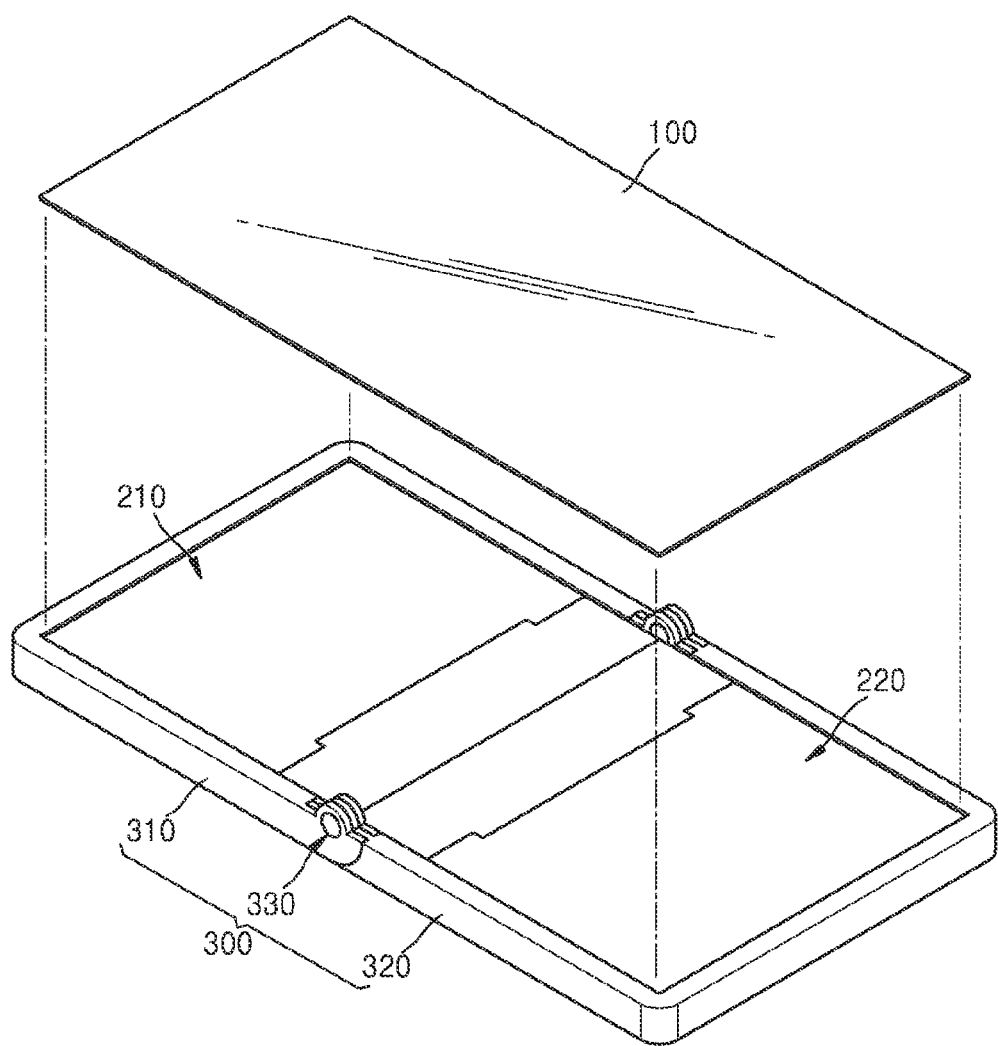
FIG. 1 is a perspective view of a foldable display apparatus according to an embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 4:
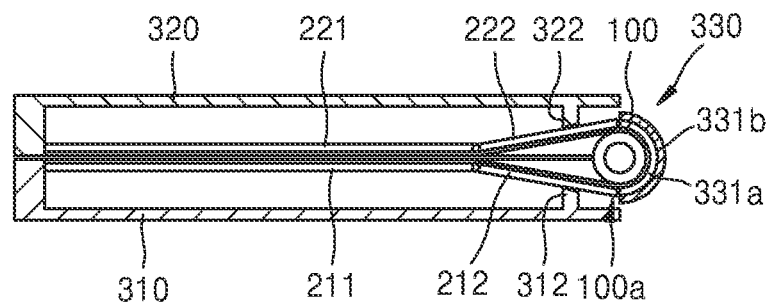

FIG. 1 is a perspective view of a foldable display apparatus according to an exemplary embodiment of the present invention. The foldable display apparatus includes a flexible display panel 100 that may be flexibly curved and operate as a display unit. In other words, the flexible display panel 100 may be a self-emissive display device, such as an OLED display device. The flexible display panel 100 generally has a thin film transistor and a light-emitting device for displaying images, which are disposed on a flexible substrate, and an encapsulation layer covering and protecting the thin film transistor and the light-emitting device. In addition, since the flexible substrate is used instead of a hard glass substrate, the flexible display panel 100 may be freely folded and unfolded within its flexibility range. Therefore, the flexible display panel 100 may be folded as shown in FIG. 4.

Figure 2:
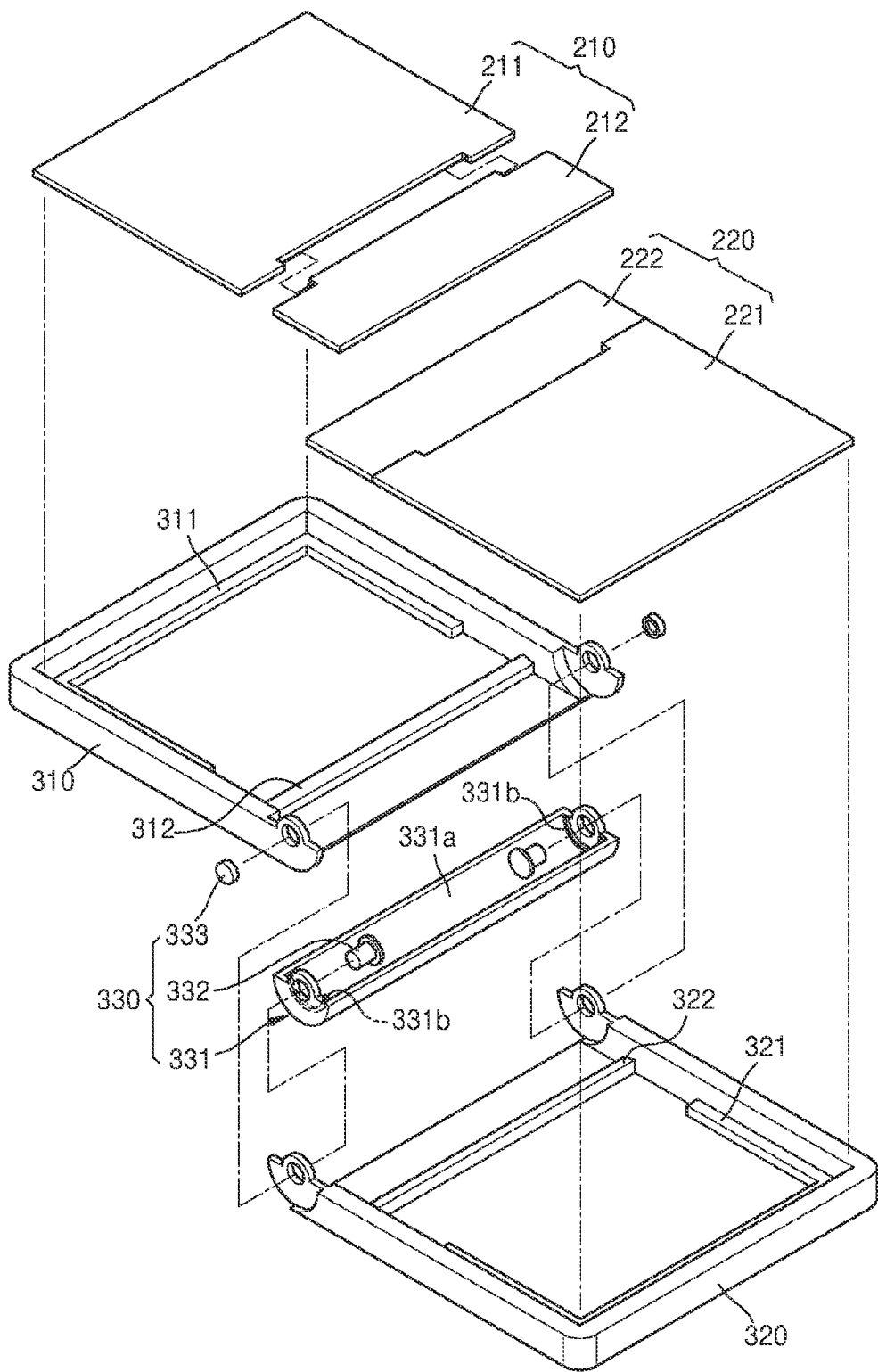
FIG. 2 is an exploded perspective view of the foldable display apparatus of FIG. 1.

The flexible display panel 100 is supported by a supporter including a case 300 and first and second support plates 210 and 220 that are foldable. The supporter will be described below with reference to FIG. 2.

The case 300 includes a first case body 310 and a second case body 320 that are coupled to each other by a hinge 330. In an unfolded state, the first and second case bodies 310 and 320 are spread flat (see FIG. 3). In a folded state, the first and second case bodies 310 and 320 are folded at the hinge 330 to overlap with each other (see FIG. 4).

The hinge 330 has a curved case 331 having a semi-circular curved recess 331a therein, and a hinge pin 332 and a hinge cap 333 for hinge-coupling the curved case 331 with the first and second case bodies 310 and 320. Here, the curved recess 331a provides a space in which a folding portion 100a (see FIG. 4) of the flexible display panel 100 may be accommodated, while forming a gentle curve when folding the case 300. In addition, the curved case 331 includes semi-circular rib 331b that supports the first and second support plates 210 and 220 when unfolding the case 300. The curved recess 331a and the rib 331b will be described in more detail later.

The first and second support plates 210 and 220 are provided in an inner side of the case 300 to directly support the flexible display panel 100. The first support plate 210 includes a first fixed support 211 that is attached and fixed on a stepped surface 311 of the first case body 310, and a first rotary support 212 that is rotatably coupled to the first fixed support 211. A side of the flexible display panel 100 is attached and fixed to the first fixed support 211. However, the side of the flexible display panel 100 supports the first rotary support 212 in a non-fixed state. The first rotatable support 212 may include a projection that is inserted into a notch formed in the first fixed support 211.

Likewise, the second support plate 220 also includes a second fixed support 221 that is attached and fixed on a stepped surface 321 of the second case body 320, and a second rotary support 222 that is rotatably coupled to the second fixed support 221. The other side of the flexible display panel 100 is fixed on the second fixed support 221, and is supported by the second rotary support 222 in a non-fixed state. The second rotatable support 222 may include a projection that is inserted into a notch formed in the second fixed support 221. A first stopper 312 and a second stopper 322 respectively regulate rotation ranges of the first and second rotary supports 212 and 222.

Figure 6:
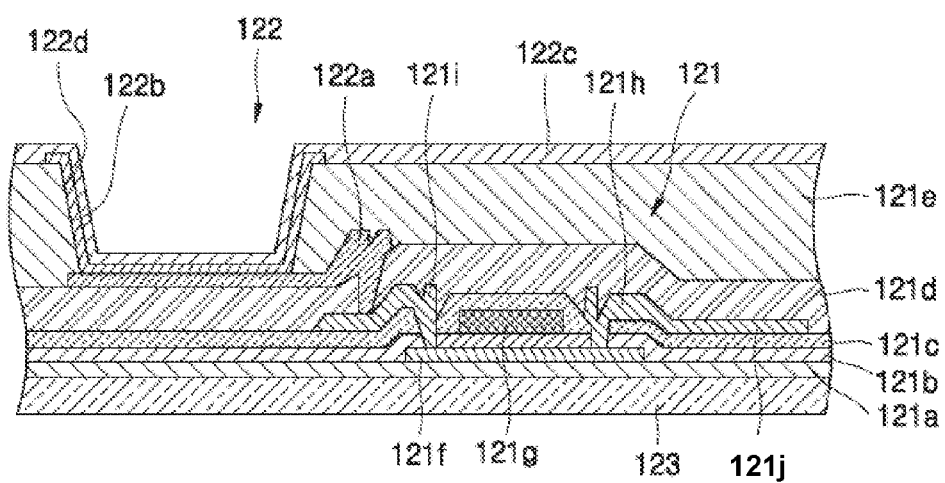
FIG. 6 is a diagram of a detailed structure of a flexible display panel in the foldable display apparatus of FIG. 1.

The flexible display panel 100 may have an inner structure as shown in FIG. 6. That is, a thin film transistor (TFT) 121 and an electroluminescence (EL) device 122 are provided, and an emission layer 122b is included in the EL device 122. In more detail, a semiconductor active layer 121f is formed on a buffer layer 121a that is adjacent to the flexible substrate 123. The semiconductor active layer 121f has a source region and a drain region that are doped with N-type or P-type impurities at a high concentration. The semiconductor active layer 121f may be formed of oxide semiconductor. For example, the oxide semiconductor may include an oxide of a material selected from groups XII, XIII, and XIV elements such as zinc (Zn), indium (In), gallium (Ga), tin (Sn), cadmium (Cd), germanium (Ge), and hafnium (Hf), or a combination thereof.

For example, the semiconductor active layer 121f may include G-I-Z-O[(In2O3)a(Ga2O3)b(ZnO)c] (a, b, and c are real numbers respectively satisfying conditions of a≥0, b≥0, and c>0). A gate electrode 121g is formed on the semiconductor active layer 121f with a gate insulating layer 121b therebetween. A source electrode 121h, a source electrode extension 121j, and a drain electrode 121i are formed on the gate electrode 121g. An interlayer insulating layer 121c is disposed between the gate electrode 121g and the source and drain electrodes 121h and 121i, and a passivation layer 121d is disposed between the source and drain electrodes 121h and 121i and an anode electrode 122a of the EL device 122.

An insulating planarization layer 121e is formed of acrylic material on the anode electrode 122a. An opening 122d is formed in the insulating planarization layer 121e, and the EL device 122 is formed in the opening 122d.

The EL device 122 emits red, green, and blue light according to a flow of electric current to display image information. The EL device 122 includes the anode electrode 122a connected to the drain electrode 121i of the TFT 121 to be provided with positive electric power from the drain electrode 121i, a cathode electrode 122c disposed to cover all pixels to provide negative electric power, and an emission layer 122b disposed between the anode electrode 122a and the cathode electrode 122c to emit light.

A hole injection layer (HIL), a hole transport layer (HTL), an electron transport layer (ETL), and an electron injection layer (EIL) may be stacked adjacent to the emission layer 122b.

The emission layer 122b may be separately formed in each of pixels, so that pixels emitting red, green, or blue light to form one unit pixel. Otherwise, the emission layer 122b may be commonly formed throughout the entire pixel region without regard to locations of the pixels. Here, the emission layer 122b may be formed by vertically stacking layers respectively including emission layers emitting red, green, and blue light, or combining the emission layers emitting red, green, and blue light. Other emission materials emitting other colors may be mixed as long as they may emit white light. Also, the emission layer 122b may further include a color conversion layer for converting white light into a predetermined color, or a color filter.

A thin film encapsulation layer (not shown), in which organic layers and inorganic layers are alternately stacked, may be formed on the cathode electrode 122c.

Since the flexible display panel 100 having the above structure may be flexible, the flexible display panel 100 may be folded or unfolded according to folding and unfolding operations of the case 300.

Figure 3:
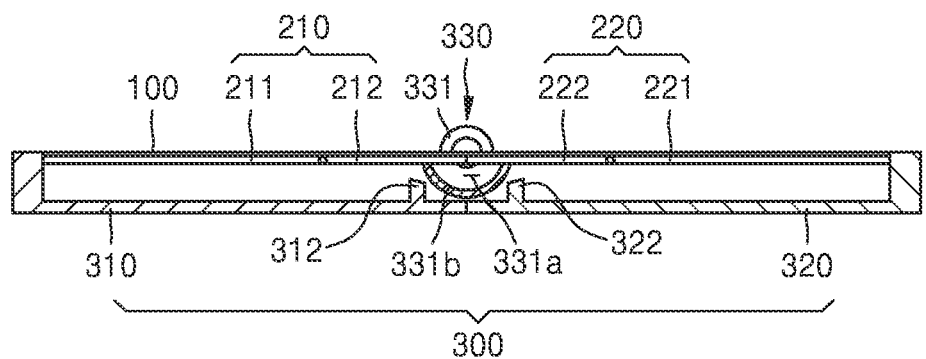
FIGS. 3 and 4 are cross-sectional views of the foldable display apparatus of FIG. 1 in an unfolded state and a folded state.

The foldable display apparatus may be configured to operate as shown in FIGS. 3 and 4. First, when the foldable display apparatus is in an unfolded state, the flexible display panel 100, the case 300, and the first and second support plates 210 and 220 are spread flat as shown in FIG. 3. Here, the rib 331b provided in the curved case 331 of the hinge 330 supports the first and second rotary supports 212 and 222 of the first and second support plates 210 and 220, so that the first and second rotary supports 212 and 222 are positioned to be parallel with the first and second fixed supports 211 and 212. Therefore, a user of the foldable display apparatus may watch a flat panel image displayed on the flexible display panel 100 that is spread flat.

In addition, when storing or carrying the foldable display apparatus, the case 300 is folded as shown in FIG. 4. Here, the first and second rotary supports 212 and 222 of the first and second support plates 210 and 220 are rotated, such that the first and second stoppers 312 and 322 support a folding portion 100a of the flexible display panel 100. As such, the folding portion 100a may be gently curved along with the curved recess 331a. Therefore, the folding portion 100a of the flexible display panel 100 is not sharply bent (creased) when folding the display apparatus. The first and second stoppers 312 and 322 may have angled ends that are configured to contact the first and second rotary supports 212 and 222. The angle of the ends may be configured to correspond to a folding angle of the first and second rotary supports 212 and 222. Accordingly, the flexible display panel 100 may not be damaged by the folding operation.

Figure 5A:
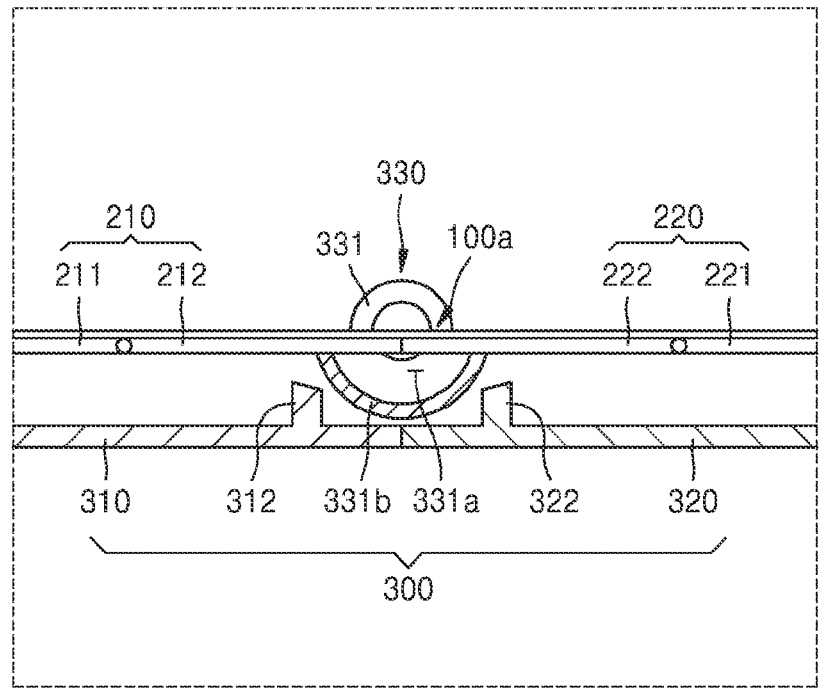
FIGS. 5A through 5D are diagrams illustrating processes of changing the foldable display apparatus of FIG. 1 from the unfolded state of FIG. 3 to the folded state of FIG. 4.

The folding and unfolding the folding portion 100a of the flexible display panel 100 is described in more detail with reference to FIGS. 5A through 5D. That is, in an unfolded state, the first and second rotary supports 212 and 222 of the first and second support plates 210 and 220 are supported by the semi-circular rib 331b of the curved case 331, so that the first and second rotary supports 212 and 222 may be parallel with (in the same plan as) the first and second fixed supports 211 and 221, as shown in FIG. 5A. Accordingly, the flexible display panel 100 may be supported by the first and second support plates 210 and 220 to be totally flat.

Figure 5B:
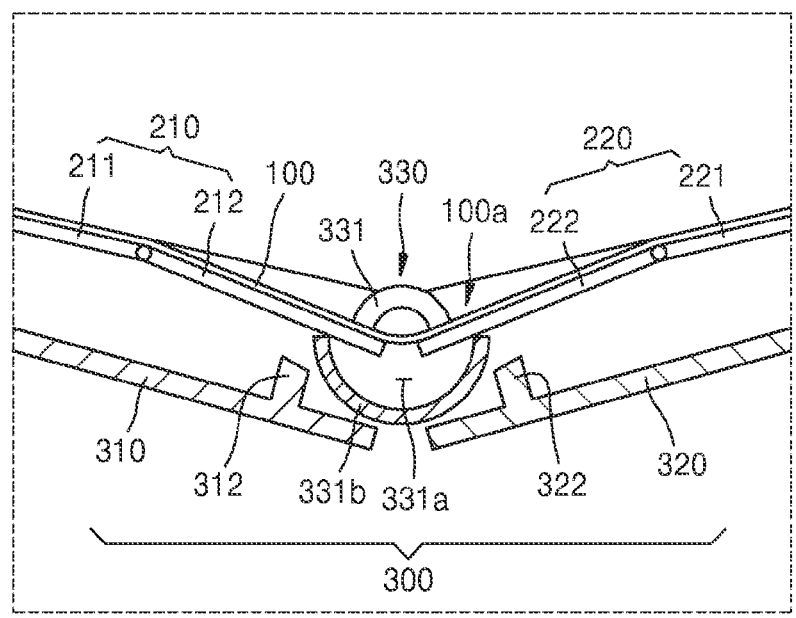

When a folding operation starts in the above state, the first and second rotary supports 212 and 222 are pushed by the folding portion 100a and rotate as shown in FIG. 5B. Here, the first and second rotary supports 212 and 222 are moved away from the semi-circular rib 331b, according to the folding operation, as the first and second rotary supports 212 and 222 rotate.

Figure 5C:
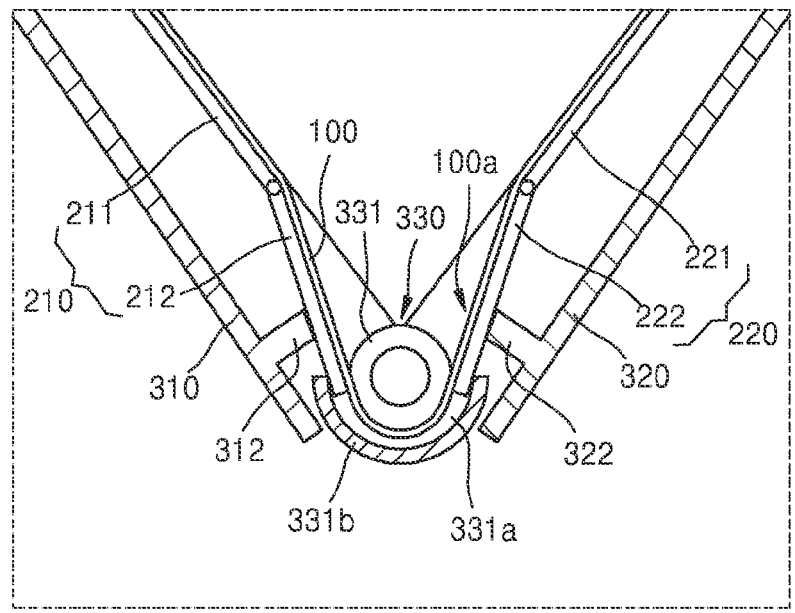
Figure 5D:
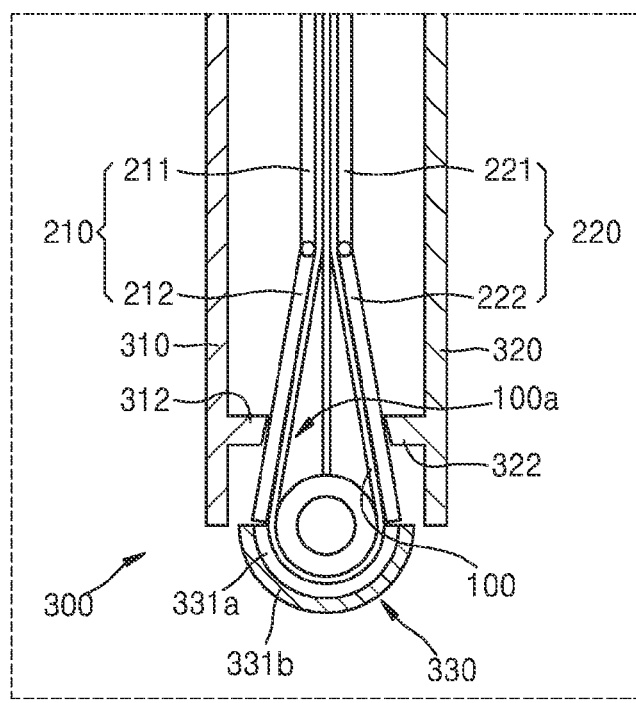

As shown in FIG. 5C, the first and second stoppers 312 and 322 contact the first and second rotary supports 212 and 222 to facilitate the bending of the bending portion 100a. If the folding operation is further performed in this state, the first and second cases 310 and 320 completely overlap with each other in a folded state, as shown in FIG. 5D. In the folded state, the folding portion 100a of the flexible display panel 100 forms a gentle curve along the curved recess 331a, rather than a sharp crease. Thus, the flexible display panel 100 may not be damaged by the folding operation, as described above.

On the other hand, when unfolding the foldable display apparatus in the folded state as above, the processes of the folding operation are performed in an opposite manner, and when the unfolding operation is finished, the flexible display panel 100 is entirely supported by the first and second support plates 210 and 220 and is in flat state. Therefore, the flat state of the flexible display panel 100 may be firmly maintained. Thus, the images may be stably displayed on the flat panel screen.

Therefore, according to various embodiments, the folding portion of the flexible display panel may be supported to have a gentle radius of curvature when folding the foldable display apparatus. Accordingly, the flexible display panel may not be damaged. Also, when unfolding the display apparatus, the entire surface of the flexible display panel may be supported firmly in a flat state. Thus, the images may be stably displayed on the flat screen of the flexible display panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A foldable display apparatus comprising:
   a flexible display panel;
   a case comprising a first case body, a second case body, and a hinge coupling the first and second case bodies;
   a first support plate coupled to the first case body to support a first side of the flexible display panel; and
   a second support plate coupled to the second case body to support a second side of the flexible display panel, wherein:
   the first support plate disposed on the first case body, the first support plate comprising a first rotary support flexibly coupled to a first fixed support, the first fixed support comprising a first notch configured to receive a first protrusion of the first rotary support, and
   the second support plate disposed on the second case body, the second support plate comprising a second rotary support flexibly coupled to a second fixed support, the second fixed support comprising a second notch configured to receive a second protrusion of the second rotary support.

2. The foldable display apparatus of claim 1, wherein:
   the first rotary support and the second rotary support are disposed adjacent to the hinge; and
   the first fixed portion and the second fixed portion are disposed on opposing sides of hinge.

3. The foldable display apparatus of claim 2, wherein the flexible display panel is fixed to the first fixed support and the second fixed support and moveable with respect to the first rotary support and the second rotary support.

4. The foldable display apparatus of claim 3, wherein the first rotary support and the second rotary supports support a folding portion of the flexible display panel and are configured to rotate.

5. The foldable display apparatus of claim 1, wherein the hinge comprises a curved case comprising a curved recess configured to accommodate the folding portion of the flexible display panel when the case is folded.

6. The foldable display apparatus of claim 5, wherein the hinge further comprises a hinge pin and a hinge cap coupling the curved case to the first case body and the second case body.

7. The foldable display apparatus of claim 5, wherein edges of the curved case are configured to support the first rotary support and the second rotary support when the case is unfolded, such that the first and second rotary supports, are in the same plane as the first and second fixed supports.

8. The foldable display apparatus of claim 7, wherein the curved case has a semi-circular cross-section.

9. The foldable display apparatus of claim 1, wherein the first case body and the second case body comprise stoppers configured to contact the first and second rotary supports when the case is in a folded position, and configured to be spaced apart from the first and second rotary supports when the case is in an unfolded position.

10. The foldable display apparatus of claim 9, wherein the ends of the stoppers are configured to contact the first and second rotary supports, and are angled to correspond to a folding angle of the first and second rotary supports when the case is in a folded position.

11. The foldable display apparatus of claim 1, wherein the first and second rotary supports are respectively hinged to the first and second fixed supports.

12. The foldable display apparatus of claim 1, wherein the flexible display panel comprises an organic light-emitting diode display device.

* * * * *